Figure 1:
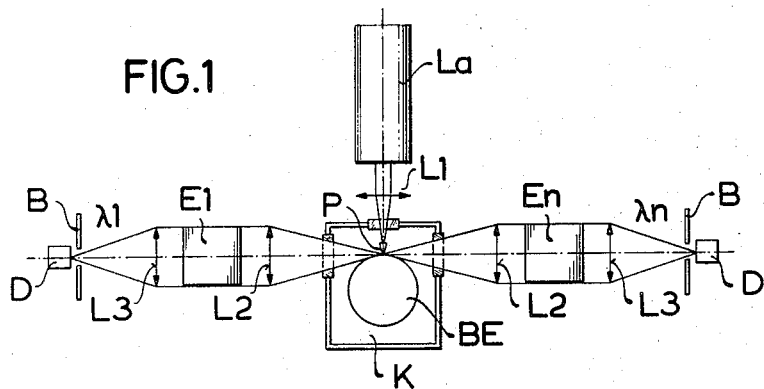

United States Patent [19]

Overhoff et al.

[11] 3,841,757
[45] Oct. 15, 1974

[54] METHOD OF DISTINGUISHING BETWEEN FUEL AND/OR BREEDER ELEMENTS INTENDED FOR OR INSERTED IN A NUCLEAR REACTOR

[75] Inventors: Theodor Overhoff, Niederzier; Hermann-Josef Stupp, Frechen, both of Germany

[73] Assignee: Kernforschungsanlage Julich Gesellschaft mit beschrankter Haftung, Julich, Germany

[22] Filed: Nov. 24, 1972

[21] Appl. No.: 309,463

[30] Foreign Application Priority Data
Nov. 26, 1971 Germany.......................... 2158572

[52] U.S. Cl........................ 356/85, 356/36, 356/86
[51] Int. Cl............................................... G01j 3/30
[58] Field of Search......................... 356/85, 86, 36

[56] References Cited
UNITED STATES PATENTS
3,413,481  11/1968  Berry ................................... 356/86
3,463,591  8/1969  Franken et al...................... 356/85

Primary Examiner—Ronald L. Wibert
Assistant Examiner—V. P. McGraw
Attorney, Agent, or Firm—Walter Becker

[57] ABSTRACT

A method of distinguishing between fuel and/or breeder elements intended for or inserted in a nuclear reactor, the fuel and/or breeder materials being contained in a graphite covering or matrix. Before the fuel and/or breeder elements are introduced into the reactor, chemical substances are added to the carbon of the covering or matrix. After oxidizing, these chemical substances are slightly diffusible and at most negligibly affect the neutron flow of the reactor; their spectral lines are undisturbed by the carbon bands and are capable of being excited by a laser pulse. The chemical substances are introduced into the graphite of the covering or matrix at such a concentration, that the macroscopic neutron absorption cross section remains small. The fuel and/or breeder elements are irradiated by laser pulses in such a way, that the plasma focus formed thereby is located in the optical beam path of a device known per se and suitable for spectrum analysis.

13 Claims, 3 Drawing Figures

PATENTED OCT 15 1974                                              3,841,757

METHOD OF DISTINGUISHING BETWEEN FUEL AND/OR BREEDER ELEMENTS INTENDED FOR OR INSERTED IN A NUCLEAR REACTOR

The present invention relates to a method of distinguishing or differentiating fuel and/or breeder elements intended for or inserted in a nuclear reactor. According to this method, the fuel and/or the breeder material is contained in a covering or in a matrix of graphite. Small amounts of chemical substances are introduced into the carbon of the covering or matrix and are spectroscopically determined or identified.

Such a distinction or differentiation is desirable for many reasons. For example, where fuels are used in a socalled pebble bed (Kugelhaufen) reactor, it is desirable to be able to recognize those fuels which have passed through the reactor and, if necessary, to arrange these elements in a specific category. Such an identification or determination is also expedient, for example, in order to control sources of error which are found to in the operation of the reactor or are due to the characteristics or properties of the fuel and/or breeder elements themselves.

It has already been proposed, for distinguishing between fuel and/or breeder elements, which have been made with the help of graphitic materials, to add traces of chemical substances to the graphitic material and to spectroscopically identify these fuel and/or breeder elements in the direct current arc. It has been found, however, that the determination of the elements is impaired because the counterelectrodes are fouled by the deposit formed during the determination and the surfaces of the elements are damaged by the arc erosion occurring in connection therewith. Moreover, since it was necessary in some instances to carry out the investigation with fuel elements which, for example in the outlet passage of a pebble bed reactor, are found in a chamber which is under a helium pressure of about 40 atmospheres absolute, ignition difficulties for the direct current arc resulted.

It is, therefore, an object of the present invention to provide a method with which it is possible with certainty to precisely distinguish between fuel and/or breeder elements which outwardly appear the same and which, as the case may be, have been subjected to different consumption or burningup processes.

It is a further object of the invention, that the presently proposed method also be applicable when the fuel and/or breeder elements to be investigated are in a chamber under a high inert gas pressure.

Figure 2:
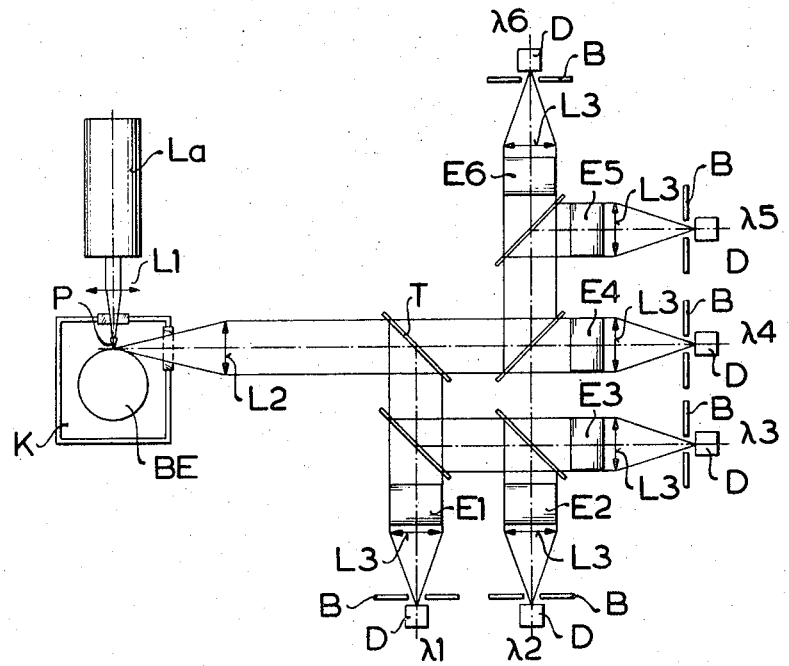
Figure 3:
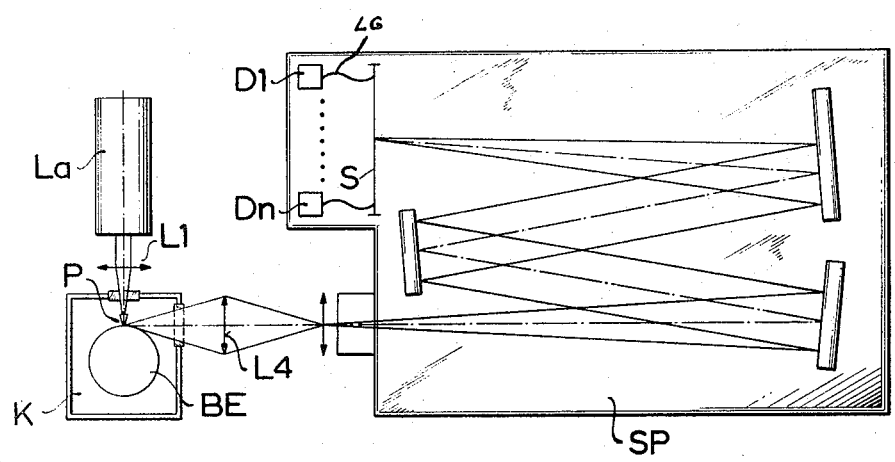

These and other objects and advantages of the invention will appear more clearly from the following specification in connection with the accompanying drawing in which FIGS. 1–3 show three different specific embodiments of the device for carrying out the method according to the invention.

The method according to the invention is characterized primarily in that, preferably before the introduction of the fuel and/or breeder elements into the reactor, chemical substances are introduced into the graphite of the covering or matrix. These chemical substances are slightly diffusible and at most negligibly affect the neutron flow of the reactor; their spectral lines are undisturbed by the carbon bands and are capable of being excited by a laser pulse. The chemical substances are introduced into the graphite of the covering or matrix at such a concentration, that the macroscopic neutron absorption cross section remains small. The fuel and/or breeder elements are irradiated by laser pulses in such a way, that the plasma focus formed thereby is located in the optical beam path of a device known per se and suitable for spectrum analysis. It has proven especially expedient to introduce as chemical substances thermally stable oxides or oxide forming substances. Beryllium, aluminum, titanium, yttrium and zirconium are especially suitable elements for distinguishing the fuel and/or breeder elements. The chemical elements are expediently added to the material of the covering or matrix under hydrostatic pressure in the form of carbonate, nitrate, or acetate solutions, and are converted to the oxide by the subsequent decomposition at temperatures between about 200° and 400° C. It is advantageous in this connection that the concentration of the chemical substances added to the graphite of the fuel and/or breeder elements not exceed 50ppm. It is further expedient, that the chemical substances intended for the differentiation be added to the graphite of the covering or matrix before the compression and carburizing steps, or before or during the introduction of the fuel and/or breeder materials into the matrix.

An especially advantageous variant of the method according to the invention consists in that the intensity of the radiation of the said plasma formed by the irradiation by means of the laser pulses is increased by placing the fuel and/or breeder elements to be distinguished in an atmosphere of inert gas under high pressure, such as helium under a minimum pressure of 10 atmospheres absolute. It has been found in this connection, that the spreading of the spectral lines, generated as a result of the pressure, remains slight in relation to the line interval. Therefore the method according to the invention is also advantageously applicable for distinguishing between fuel and/or breeder elements which have passed the core of a pebble bed reactor, if the measurement is carried out at the outlet of the nuclear reactor, since pebble bed reactors with helium are cooled, in the course of which the helium pressure in the outlet is generally above 10 atmospheres absolute.

It is also very advantageous to carry out the method according to the invention in such a way that the plasma in the focus is postheated (nachgeheizt) by the spikes formed with the laser in unspoiled condition in a manner known per se at intervals measured in $\mu$ sec. This is possible because in this manner the temperature gradient or lapse rate in the axis of the plasma is kept low.

In order to have as broad a scale of distinguishing features as possible, despite the use of only a few chemical substances to distinguish fuel and/or breeder elements, it is expedient, if needed, to add several chemical substances suitable for distinguishing. Also, all combinations of the added substances should be used with the spectroscopic analysis for identifying the fuel and/or breeder elements.

As has been found, it is also possible to identify the burn-up of the fuel and/or breeder elements by using the method acording to the invention if the loading or charging plan and the rheology of the nuclear reactor are known.

Referring now to the drawing in detail, the fuel element BE in the container K — which can also be, for example, a part of the outlet of a nuclear reactor — is irradiated in such a way by the pulses given off by the laser La and focused by the optical system $L_1$, that, as indicated in the drawing, a plasma focus P is formed. The container K can for this purpose if necessary — not shown in the drawing — be built as a pressure chamber. The container K has an entry window for the laser pulses and a number of exit windows corresponding to the number of spectrometers, in whose beam path the plasma focus is formed — only two of which are shown in FIG. 1. It is also possible in place of this — as illustrated in FIG. 2 — to so arrange beam splitters T, which are known per se, that the spectral emission formed as a result of the laser pulses is split up and, after splitting, lies in the optical beam path of the subsequent optical monochromators $E_1$ to $E_6$. In this instance it is sufficient to provide one exit window. With the specific embodiment illustrated in FIG. 1, the plasma light respectively arriving in the optical monochromators $E_1$ and $E_n$ over the optical system $L_2$ is split up into light of the selected wave lengths $\lambda_1$ and $\lambda_n$ and arrives over the optical system $L_3$ and the aperture plate B into the detector D, where it is registered. Likewise with the specific embodiment shown in FIG. 2, the plasma light arrives in the detectors D through the optical monochromators $E_1$ to $E_6$, and the optical system $L_3$ as well as the aperture plate B, while being split up into light having the wave lengths, $\lambda_1$ to $\lambda_6$. As shown with the specific embodiment of FIG. 3, it is of course also possible, in the place of the optical monochromators, to utilize the dispersing property of a spectrometer SP and to optically couple the detectors $D_1$ to $D_n$ through flexible light guides (LG) with the loci of the spectral lines on the focal area (S).

EXAMPLE

A calcium-wolframate-laser having 0.5 to 2.0 joules output power and 200 $\mu$ sec. pulse duration is used to form the plasma focus. Aqueous solutions of the doping substances are added to the graphite of the fuel element balls in such a concentration that the respective doping substance added to the graphite of the fuel element balls is present at a proportion of 50ppm. The determination or identification is carried out in an atmosphere of various inert gases. For this purpose helium exhibits the most favorable properties with respect to the intensity of the radiation of the plasma. It is especially advantageous in this connection to use helium at a pressure of about 40 atmospheres absolute. The spectal splitting, either by means of optical monochromators according to FIGS. 1 and 2 or by a spectrometer according to FIG. 3, results for the sorting logic in a clear identification base with the selected spectral lines through the pulse integrals of the detectors having an information signal-spurious or interfering signal ratio of better than 5:1. The above is true even if five doping substances are added to the graphite of a fuel element at the same time.

It may be added that the term "fuel elements" as used in the claims is intended to cover fuel elements, breeder elements, or a combination of the two.

It is, of course, to be understood that the present invention is, by no means, limited to the specific showing of the drawing or example, but also comprises any modifications within the scope of the appended claims.

What we claim is:

1. A method of characteristically distinguishing between fuel elements intended for use in a nuclear reactor, said fuel elements being held in a graphite covering, which includes the steps of: introducing into the graphite of said covering chemical substances which are only slightly diffusible and at most negligibly affect the neutron flow of the reactor, the spectral lines of said chemical substances being undisturbed by the carbon bands and capable of being excited by a laser pulse, said chemical substances being introduced into said graphite at such a concentration that the macroscopic neutron absorption cross section remains small; and irradiating said fuel elements intended for use in said reactor with laser pulses so as to form a plasma focus and locating the same in the optical beam path of a suitable spectrum analysis device.

2. A method according to claim 1, in which said chemical substances are selected from the group consisting of thermally stable oxides and oxide-forming substances.

3. A method according to claim 1, in which said chemical substances are selected from the group of elements consisting of beryllium, aluminum, titanium, yttrium, and zirconium.

4. A method according to claim 3, in which said chemical substances are added to the material of said covering as solutions selected from the group consisting of carbonates, nitrates, and acetates under a hydrostatic pressure, and are converted to the oxide by means of subsequent decomposition at temperatures between approximately 200° and 400° C.

5. A method according to claim 1, in which said chemical substances are added to said graphite of said covering before compression and carburization.

6. A method according to claim 1, in which said chemical substances are added to said graphite of said covering at least by the time the introduction of said fuel elements intended for use in said reactor is complete.

7. A method according to claim 1, in which the concentration of said chemical substances added to said graphite is not over 50ppm.

8. A method according to claim 1, in which the intensity of the radiation of said plasma formed by means of said irradiation with laser pulses is increased by introducing said fuel elements intended for use in said reactor into an atmosphere of inert gas under high pressure.

9. A method according to claim 8, in which said inert gas under high pressure is helium under a pressure of at least 10 atmospheres absolute.

10. A method according to claim 1, in which the plasma in said focus is postheated by spikes formed with the laser in unspoiled condition at intervals measured in $\mu$ sec.

11. A method according to claim 1, in which a plurality of said chemical elements are added, all combinations of said added chemical substances being used for said spectroscopic analysis.

12. A method of characteristically distinguishing between breeder elements intended for use in a nuclear reactor, said breeder elements being held in a graphite covering, which includes the steps of: introducing into the graphite of said covering chemical substances which are only slightly diffusible and at most negligibly affect the neutron flow of the reactor, the spectral lines of said chemical substances being undisturbed by the carbon bands and capable of being excited by a laser pulse, said chemical substances being introduced into said graphite at such a concentration that the macroscopic neutron absorption cross section remains small; and irradiating said breeder elements intended for use in said reactor with laser pulses so as to form a plasma focus and locating the same in the optical beam path of a suitable spectrum analysis device.

13. A method of characteristically distinguishing between a combination of fuel elements and breeder elements intended for use in a nuclear reactor, said combination of fuel elements and breeder elements being held in a graphite covering, which includes the steps of: introducing into the graphite of said covering chemical substances which are only slightly diffusible and at most negligibly affect the neutron flow of the reactor, the spectral lines of said chemical substances being undisturbed by the carbon bands and capable of being excited by a laser pulse, said chemical substances being introduced into said graphite at such a concentration that the macroscopic neutron absorption cross section remains small; and irradiating said combination of fuel elements and breeder elements intended for use in said reactor with laser pulses so as to form a plasma focus and locating the same in the optical beam path of a suitable spectrum analysis device.

* * * * *